(12) United States Patent
Lu et al.

(10) Patent No.: US 11,490,727 B2
(45) Date of Patent: Nov. 8, 2022

(54) ASSEMBLY-FRIENDLY TABLE FRAME AND TABLE

(71) Applicant: ZHEJIANG JIECANG LINEAR MOTION TECHNOLOGY CO., LTD., Zhejiang (CN)

(72) Inventors: Xiaojian Lu, Zhejiang (CN); Renchang Hu, Zhejiang (CN); Zhongling Li, Zhejiang (CN); Donghang Zhang, Zhejiang (CN); Bo Li, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/435,400

(22) PCT Filed: Apr. 19, 2019

(86) PCT No.: PCT/CN2019/083344
§ 371 (c)(1),
(2) Date: Sep. 1, 2021

(87) PCT Pub. No.: WO2020/220150
PCT Pub. Date: Nov. 5, 2020

(65) Prior Publication Data
US 2022/0142356 A1    May 12, 2022

(30) Foreign Application Priority Data

Mar. 1, 2019  (CN) .................. 201910156456.X

(51) Int. Cl.
*A47B 13/02*     (2006.01)
(52) U.S. Cl.
CPC ...... *A47B 13/021* (2013.01); *A47B 2013/022* (2013.01); *A47B 2200/0029* (2013.01); *A47B 2230/07* (2013.01)

(58) Field of Classification Search
CPC ............ A47B 13/021; A47B 2013/022; A47B 2200/0029; A47B 2230/07
(Continued)

(56) References Cited

U.S. PATENT DOCUMENTS 3,966,340 A * 6/1976 Morris ..................... F16B 12/22
                                                        248/188.8
5,037,232 A * 8/1991 Pakdipanichpong ..... B60P 3/36
                                                        108/150

(Continued)

FOREIGN PATENT DOCUMENTS

| CN | 201730918 | 2/2011 |
| CN | 102083701 | 6/2011 |

(Continued)

OTHER PUBLICATIONS

"International Search Report (Form PCT/ISA/210) of PCT/CN2019/083344," dated Nov. 29, 2021, with English translation thereof, pp. 1-4.

*Primary Examiner* — Janet M Wilkens
*Assistant Examiner* — Timothy M Ayres
(74) *Attorney, Agent, or Firm* — JCIPRNET

(57) ABSTRACT

Disclosed is an assembly-friendly table frame, which relates to the field of lift tables. The table frame includes an upright and a base stand mounted to the underside of the upright; one of the base stand or the upright is securely coupled with a connecting member, and the other thereof is provided with a locking bump; the connecting member includes an insert-fitting rail and a locking slot provided in the insert-fitting rail; the locking bump is sequentially inserted into the insert rail and slid to be snapped into the locking slot; the table frame further includes an ejector member configured to eject the locking bump out of the locking slot. Further disclosed is a table applying the table frame. An advantage of the (Continued)

present disclosure lies in enhancing convenience of assembly and disassembly between the upright and the base stand.

9 Claims, 3 Drawing Sheets

(58) Field of Classification Search
USPC .................. 108/153.1–158.13; 312/351.3
See application file for complete search history.

(56) References Cited

U.S. PATENT DOCUMENTS

| | | | | |
|---|---|---|---|---|
| 5,826,850 | A * | 10/1998 | Goldsmith | B63B 29/06 108/150 |
| 6,588,717 | B2 * | 7/2003 | Carnahan | F16M 11/22 248/188.8 |
| 10,918,203 | B1 * | 2/2021 | Schneider | H01R 33/05 |
| 2005/0066862 | A1 * | 3/2005 | Choi | A47B 3/06 108/155 |
| 2008/0149007 | A1 * | 6/2008 | MacLean | A47B 13/021 248/188 |
| 2017/0224101 | A1 | 8/2017 | Bruder et al. | |

FOREIGN PATENT DOCUMENTS

| | | | | |
|---|---|---|---|---|
| CN | 106617677 | A * | 5/2017 | ............ A47B 13/021 |
| CN | 110477600 | A * | 11/2019 | |
| CN | 112075757 | A * | 12/2020 | |
| EP | 0383552 | | 8/1990 | |
| JP | 2000230519 | | 8/2000 | |
| JP | 2004176874 | | 6/2004 | |
| JP | 2005188675 | | 7/2005 | |
| KR | 20110008830 | U * | 9/2011 | |
| WO | WO-2007122057 | A2 * | 11/2007 | ............ A47B 91/00 |

* cited by examiner

ASSEMBLY-FRIENDLY TABLE FRAME AND TABLE

CROSS-REFERENCE TO RELATED APPLICATION

This application is a 371 of international application of PCT application serial no. PCT/CN2019/083344, filed on Apr. 19, 2019, which claims priority to and the benefit of China Patent Application No. 201910156456.X, filed on Mar. 1, 2019. The entirety of each of the above-mentioned patent applications is hereby incorporated by reference herein and made a part of this specification.

FIELD

Embodiments of the present disclosure relates to lift tables, and more particularly relate to an assembly-friendly table frame and a table.

BACKGROUND

Tables are indispensable furniture in life and work. Conventional tables, e.g., office desks, mainly include a tabletop, uprights disposed at both sides under the tabletop, and base stand mounted to bottom of the uprights; generally, the base stands are mounted vertical to the uprights. However, such configurations are unfriendly to package and ship. To reduce package size, many manufacturers generally package the base stands separately from the uprights before shipping, leaving the assembly work to end users or dealers.

Currently, the connection between uprights and base stands basically relies on fastening screws. To enhance stability, more screws are usually used. Such an assembly manner is inconvenient for end users to assemble and disassemble.

SUMMARY

Embodiments of the present disclosure provide a table frame that facilitates assembly and disassembly between uprights and base stands.

To overcome the above and other technical problems, the following technical solutions are provided:

In an embodiment, there is provided an assembly-friendly table frame, comprising an upright, and a base stand mounted to the top of the upright, wherein one of the base stand or the upright is securely coupled with a connecting member, and the other thereof is provided with a locking bump, the connecting member includes an insert-fitting rail and a locking slot provided in the insert-fitting rail, the locking bump is sequentially inserted into the insert-fitting rail and slid to be snapped into the locking slot, the table frame further comprises an ejector member configured to eject the locking bump out of the locking slot.

The present disclosure has the following advantages:

In the present disclosure, interlocking between the connecting member and the locking bump is used to replace conventional fastening screws, such that during the locking process, it is only needed to insert the locking bump along the insert-fitting rail and then slide the locking bump to be snapped into the locking slot; the whole assembly process can be completed with a single action, without using any tools. The locking bump, when being disposed in the locking slot, maintains interlocking between the upright and the base stand. In cases of a need to eject the locking bump out of the locking slot, an ejector member may be leveraged to apply an ejection force to push the locking bump out, thereby implementing unlocking. Of course, upon assembly, the ejector member may also be leveraged to smoothly snap the locking bump into the locking slot. This connection manner significantly enhances assembly friendliness because the assembly procedure can be completed with a single action without using any tools. Furthermore, the connecting member, the locking bump, and the ejector member in the present disclosure may be pre-mounted to the upright or base stand, which may avoid assembly difficulties due to loosening or missing of fastening screws.

In a preferred embodiment, the insert-fitting rail includes an insert rail and a detachment-proof rail, wherein the insert rail and the detachment-proof rail are intersected and communicated, and the locking slot is provided inside the detachment-proof rail.

In a preferred embodiment, a guide surface is provided between the insert rail and the detachment-proof rail, wherein the locking bump slides into the locking slot from the insert rail under a guiding action of the guide surface.

In a preferred embodiment, the connecting member includes a cylindrical member, wherein the insert rail and the detachment-proof rail are disposed at a circumferential side surface of the cylindrical member, the insert rail being arranged along an axial direction of the cylindrical member, the detachment-proof rail being arranged along a circumferential direction of the cylindrical member, the locking bump being inserted into the insert rail and then circumferentially rotated to enter the detachment-proof rail.

In a preferred embodiment, the locking slot is a recess provided at a bottom wall or a top wall of the detachment-proof rail, the guide surface being provided where the insert rail and the detachment-proof rail are intersected.

In a preferred embodiment, the connecting member is securely connected to the bottom of the upright, a connecting hole is provided on the base stand, and the locking bump is formed by projecting radially inwardly from the inner wall of the connecting hole.

In a preferred embodiment, an elastic slot is provided for the base stand, the elastic slot being disposed at each side of the locking bump, the ejector member being disposed at an axial side of the locking bump.

In a preferred embodiment, the base stand includes a top plate and a base plate, wherein the connecting hole is arranged on the top plate, and the ejector member is a knob or a button movably mounted on the base plate.

In a preferred embodiment, the connecting member is mounted on the upright, wherein at least one auxiliary positioning rail is provided on the connecting member, and a matched auxiliary positioning bump corresponding to the auxiliary positioning rail is provided on the base stand, such that as the locking bump is inserted into the insert-fitting rail, the auxiliary positioning bump is also inserted into the auxiliary positioning rail.

In another aspect of the present disclosure, there is further provided a table, comprising a tabletop and a table frame, wherein the table frame refers to the table frame described in any of the solutions above.

The above features and advantages of the present disclosure will be described in detail in the preferred embodiments with reference to the accompanying drawings below.

BRIEF DESCRIPTION OF THE SEVERAL VIEWS OF THE DRAWINGS

Hereinafter, the present disclosure will be described in further detail with reference to the accompanying drawings.

DETAILED DESCRIPTION

Figure 1:
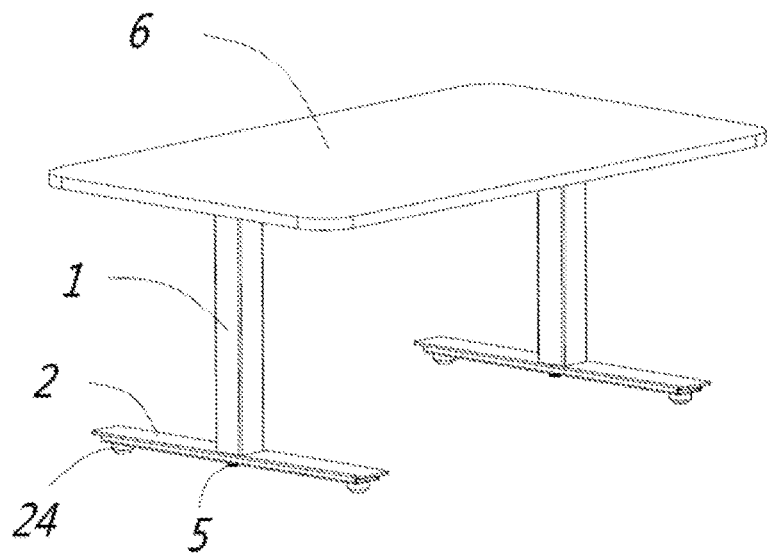
FIG. 1 is a structural schematic view of a table frame mounted to the underside of a tabletop according to a first embodiment of the present disclosure.
Figure 2:
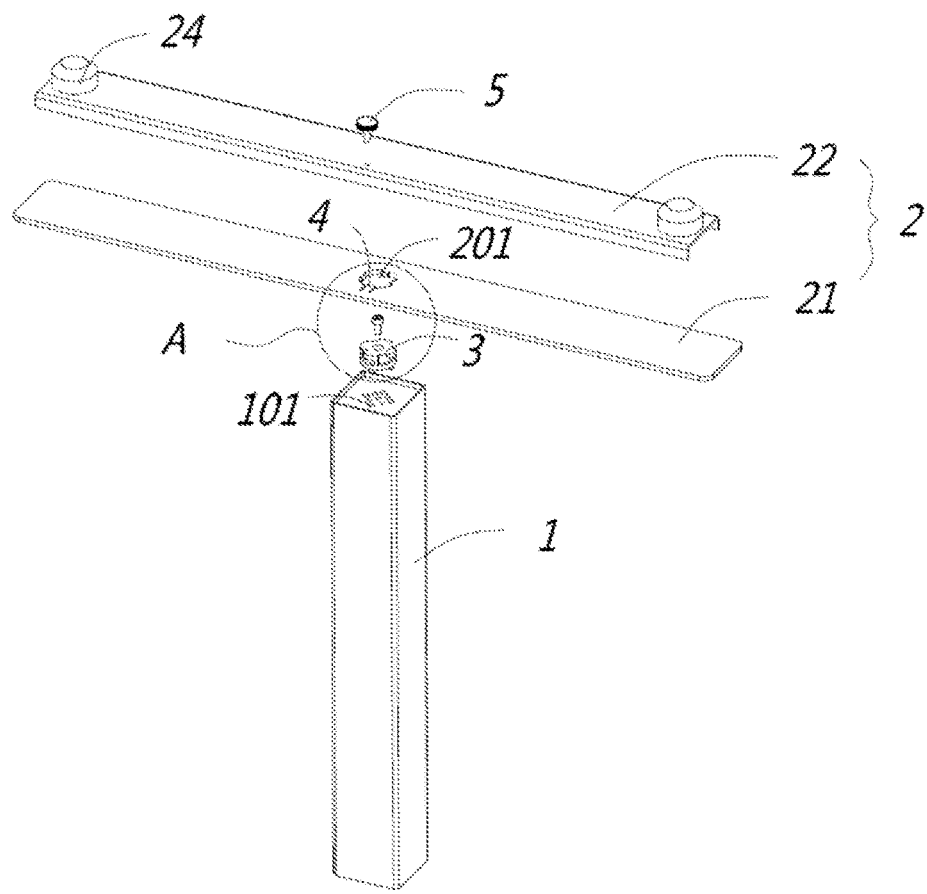
FIG. 2 is a schematic view of assembling the table frame according to the first embodiment of the present disclosure.

Hereinafter, the technical solutions of the embodiments of the present disclosure will be explained and illustrated with reference to the accompanying drawings corresponding to the embodiments of the present disclosure. However, the embodiments are only preferred embodiments of the present disclosure, not all of them. Other embodiments obtained by those skilled in the art without exercise of inventive work based on the examples in the embodiments all fall within the protection scope of the present disclosure.

In the description below, the orientation or position relationships indicated by the terms "inner," "outer," "upper," "lower," "left," and "right," etc. are intended only for facilitating or simplifying description of the present disclosure, not for indicating or implying that the devices or elements surely possess those specific orientations and are surely configured and operated with those specific orientations, therefore, they should not be understood as limitations to the present disclosure.

First Embodiment

A table frame is provided, which is mainly applied to an office desk with an upright 1. The table frame comprises an upright 1 and a base stand 2 mounted to the underside of the upright 1, the upright 1 and the base stand 2 being intersected with an angle, generally intersected vertically. In this embodiment, the base stand 2 and the upright 1 are connected with a ready-to-assemble structure. Specifically, one of the base stand 2 or the upright 1 is securely connected with a connecting member 3, and the other there of is provided with a locking bump 4; the connecting member 3 comprises an insert-fitting rail 31 and a locking slot 303 provided in the insert-fitting rail 31; the locking bump 4 is sequentially inserted in the insert-fitting rail 31 and slid to be snapped into the locking slot 303; the locking bump 4, when being disposed in the locking slot 303, maintains interlocking between the upright 1 and the base stand 2; wherein the table frame further comprises an ejector member 5 configured to eject the locking bump 4 out of the locking slot 303.

In this embodiment, interlocking between the connecting member 3 and the locking bump 4 are leveraged to replace conventional fastening screws, such that during the locking process, it is only needed to insert the locking bump 4 along the insert-fitting rail 31 and then slide the locking bump 4 to be snapped into the locking slot 303; the whole assembly process can be implemented with a single action, without using any tools. The locking bump 4, when being disposed in the locking slot 303, maintains interlocking between the upright 1 and the base stand 2; while when it is needed to eject the locking bump 4 out of the locking slot 303, an ejector member 5 may be leveraged to apply an ejection force to push the locking bump 4 out, thereby implementing unlocking. Of course, upon assembly, the ejector member 5 may also be leveraged, to smoothly snap the locking bump 4 into the locking slot 303. This connection manner significantly enhances assembly friendliness because the assembly procedure can be completed with a single action without using any tools, further, in this embodiment, the connecting member 3, locking bump 4, and ejector member 5 may be pre-mounted to the upright 1 or base stand 2, thereby avoiding assembly difficulties due to loosening or missing of fastening screws.

A specific preferred structure of this embodiment is provided below:

In the embodiment, the connecting member 3 is preferably securely coupled to the upright 1, then the locking bump 4 is preferably arranged on the base stand 2, the connecting member 3 is preferably inserted, via at least two positioning bumps 32, into a positioning hole 101 provided in the bottom of the upright 1 and fixed with a fastening screw 11. The detailed connection manner of the locking bump 4 will be described later.

In this embodiment, the insert-fitting rail 31 in the connecting member 3 is of a two-segment type, including an insert rail 301 and a detachment-proof rail 302, wherein the insert rail 301 and the detachment-proof rail 302 are intersected and communicated, and the locking slot 303 is disposed in the detachment-proof rail 302. With arrangement of the two-segment intersected rail, the insert direction of the insert-fitting rail 302 is different from the pull-out direction thereof, such that the detachment-proof rail 302 itself may play a detachment-proof role; while by disposing the locking slot 303 in the detachment-proof rail 302, it is further guaranteed that the locking bump 4 does not break free from the detachment-proof rail 302.

It is noted that in other embodiments, the insert-fitting 31 is not limited to the two-segment type, which may be three-segment, four-segment, or even one-segment; any manner which implements connection between the base stand 2 and the upright 1 by insert-fitting in conjunction with the locking slot falls within the protection scope of the present disclosure.

Additionally, to facilitate assembly, a guide surface 33 is provided between the insert rail 301 and the detachment-proof rail 302, such that the locking bump 4 is slid into the locking slot 303 from the insert rail 301 under the guiding action of the guide surface 33. As such, to assemble the base stand 2 and the upright 1, the structure of the guide surface 33 enables the locking bump 4 to be directly snapped into the locking slot 303 without using the ejector member 5, which further simplifies the assembly procedure.

Figure 3:
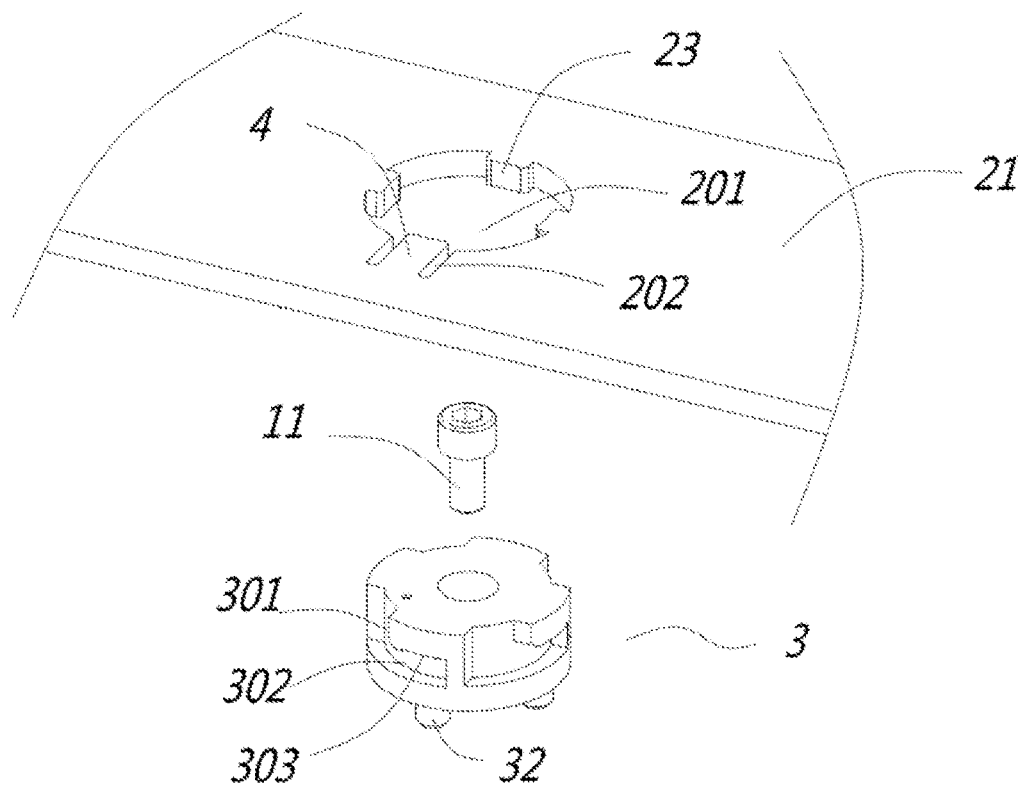
FIG. 3 is an enlarged view of part A in FIG. 2.
Figure 4:
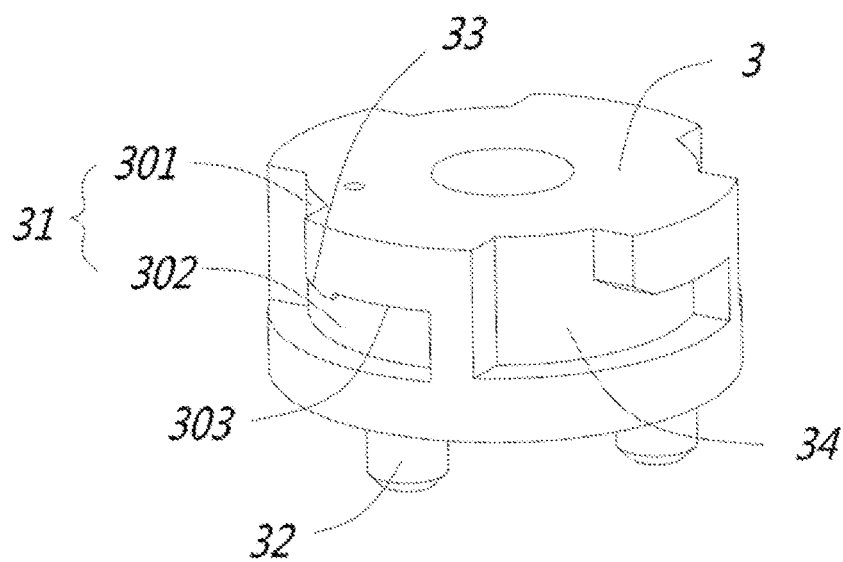
FIG. 4 is a structural schematic view of the connecting member in the first embodiment of the present disclosure.
Figure 5:
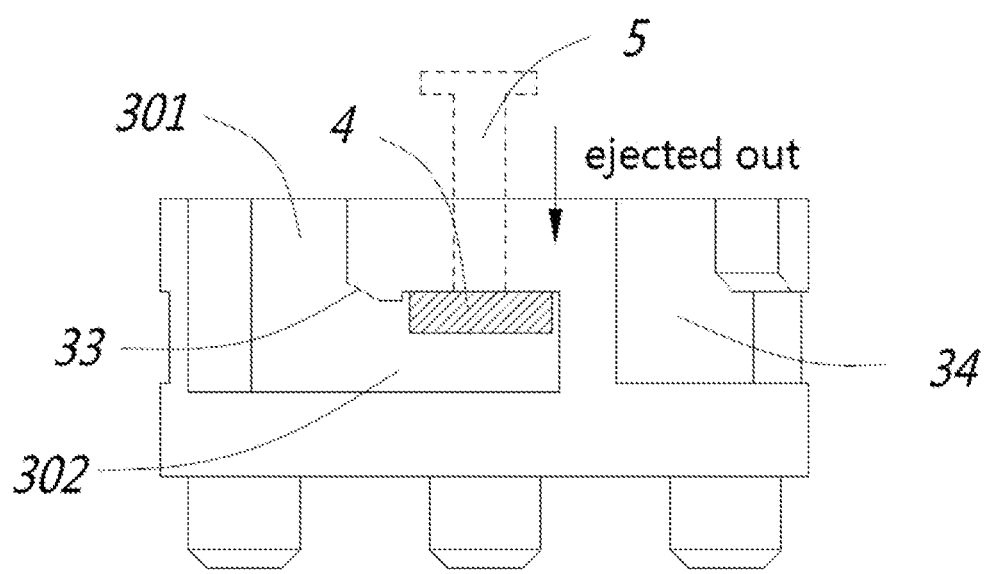
FIG. 5 is a schematic diagram of lock-fit between the connecting member and the locking bump in the first embodiment of the present disclosure.

FIGS. 3~5 illustrate a specific structure of the connecting member 3 according to this embodiment. The connecting member 3 includes a cylindrical member, wherein the insert rail 301 and the detachment-proof rail 302 are disposed at the circumferential side surface of the cylindrical member, the insert rail 301 being arranged axially along the cylindrical member, the detachment-proof rail 302 being arranged along the circumferential direction of the cylindrical member.

To assemble, the locking bump 4 on the base stand 2 is aligned to the insert rail 301 of the connecting member 3, such that the locking bump 4 is inserted into the insert rail 301 along the axial direction of the connecting member 3; after the locking bump 4 is inserted into the insert rail 301, the base stand 2 and the upright 1 are oppositely rotated to an angle such that the locking bump 4 is rotated circumferentially into the detachment-proof rail 302; in this way, the connecting member 3 is axially positioned relative to the locking bump 4, such that axial displacement unlikely occurs between the upright 1 and the base stand 2.

To ensure that the locking bump 4 is locked in the detachment-proof rail 302, a locking slot 303 is provided in the detachment-proof rail 302. Specifically, the locking slot 303 is a recess provided on the bottom wall or the top wall of the detachment-proof rail 302, and a guide surface 33, which is an inclined face, is provided where the insert rail 301 and the detachment-proof rail 302 are intersected, as illustrated in FIG. 4 or FIG. 5.

FIG. 3 illustrates the locking bump 4, wherein the connecting hole 201 is preferably provided in the base stand 2; the locking bump 4 is formed by projecting radially inwardly along the inner wall of the connecting hole 201. The locking bump 4 of this structure is more compact, such that the connecting member 3 can be accommodated in the connecting hole 201, which does not affect the overall thickness of the base stand 2 and is more convenient to manufacture.

It is noted that the structure of the locking bump 4 is not limited to the shape described herein, which may also be an L-shaped connecting block welded to the base stand 2, e.g., the connecting block includes a transverse segment serving as a lock-fitting bump and a vertical segment coupled to the base stand 2.

To enhance the elastic deformability of the locking bump 4, an elastic slot 202 is provided for the base stand 2, the elastic slot 202 being provided at each side of the locking bump 4, wherein the ejector member 5 is disposed at the axial side of the locking bump 4, the axial direction herein referring to the direction of the action force applied by the ejector member 5 against the locking bump 4. With the elastic slots 202 at both sides, the elastic deformability of the locking bump 4 is enhanced.

In an embodiment, the base stand 2 includes a top plate 21 and a base plate 22, wherein a foot pad 24 is further mounted to each end of the underside of the base plate 22. The connecting hole 201 is disposed on the top plate 21, and the ejector member 5 is a knob or a bottom movably mounted on the base plate. In this embodiment, the ejector member 5 is preferably a knob, specifically a manually rotated nut, thereby realizing axial displacement by manual rotation to axially eject the locking bump 4 out; the knob is preferably pre-mounted on the base stand 2. In an alternative embodiment, the ejector member 5 may be a button. Additionally, the base stand 2 is not limited to including the top plate 21 and the base plate 22, which may also be an integral plate. Such simple modifications fall within the protection scope of the present disclosure.

Additionally, to enhance the stability of detachment-proof between the upright 1 and the base stand 2, the connecting member 3 is installed on the upright 1, wherein at least one auxiliary positioning rail 34 is provided on the connecting member 3, a matched auxiliary positioning bump 23 corresponding to the auxiliary positioning rail 34 is provided on the base stand 2, such that as the locking bump 4 is inserted into the insert rail 31, the auxiliary positioning bump 23 is also inserted into the auxiliary positioning rail 34.

In this embodiment, the auxiliary positioning rail 34 is preferably provided in three, so is the auxiliary positioning bump 23. The structure of the auxiliary positioning rail 34 is substantially consistent with the insert-fitting rail 31, and the structure of the auxiliary positioning block 23 is also consistent with that of the locking bump 4; the difference lies in that the auxiliary positioning rail 34 is not provided with the locking slot 303, and the auxiliary positioning block 23 does not need a good elastic deformability, because the auxiliary positioning rail 34 only plays a role of preventing axial displacement of the auxiliary positioning bump 23, rather than locking the auxiliary positioning bump 23.

Second Embodiment

As illustrated in FIG. 1, a table is provided, comprising a tabletop 6 and a table frame mounted to the underside of the tabletop 6, the table frame including an upright 1 and a base stand 2 mounted to the underside of the upright 1, wherein the table frame refers to the one described in the first embodiment or an equivalent.

What have been described above are only preferred embodiments of the present disclosure; however, the protection scope of the present disclosure is not limited thereto. A person skilled in the art should understand that the present disclosure includes, but not limited to the contents described in the drawings and the preferred embodiments. Any modifications without departing from the functions and structural principles of the present disclosure will be included within the scope of the claims.

What is claimed is:

1. An assembly-friendly table frame, comprising an upright, and a base stand mounted to a bottom of the upright, wherein one of the base stand or the upright is securely coupled with a connecting member, and the other thereof is provided with a locking bump; the connecting member includes an insert-fitting rail and a locking slot provided in the insert-fitting rail; the locking bump is sequentially inserted into the insert-fitting rail and slid to be snapped into the locking slot, when the locking bump disposed in the locking slot maintains interlocking between the upright and the base stand; wherein the table frame further comprises an ejector member configured to eject the locking bump out of the locking slot, and the connecting member is securely connected to the bottom of the upright, a connecting hole is provided on the base stand, and the locking bump is formed by projecting radially inwardly from the inner wall of the connecting hole.

2. The table frame according to claim 1, wherein the insert-fitting rail includes an insert rail and a detachment-proof rail, wherein the insert rail and the detachment-proof rail are intersected and communicated, and the locking slot is provided inside the detachment-proof rail.

3. The table frame according to claim 2, wherein a guide surface is provided between the insert rail and the detachment-proof rail, wherein the locking bump is slid into the locking slot from the insert rail under a guiding action of the guide surface.

4. The table frame according to claim 2, wherein the connecting member includes a cylindrical member, the insert rail and the detachment-proof rail are disposed at a circumferential side surface of the cylindrical member, the insert rail is arranged along an axial direction of the cylindrical member, the detachment-proof rail is arranged along a circumferential direction of the cylindrical member, and the locking bump is inserted into the insert rail and then circumferentially rotated to enter the detachment-proof rail.

5. The table frame according to claim 4, wherein the locking slot is a recess provided at a bottom wall or a top wall of the detachment-proof rail, and a guide surface is provided where the insert rail and the detachment-proof rail are intersected.

6. The table frame according to claim 1, wherein an elastic slot is provided for the base stand, the elastic slot being disposed at each side of the locking bump, the ejector member being disposed at an axial side of the locking bump.

7. The table frame according to claim 6, wherein the base stand includes a top plate and a base plate, wherein the connecting hole is arranged on the top plate, and the ejector member is a knob or a button movably mounted on the base plate.

8. The table frame according to claim 1, wherein the connecting member is mounted on the upright, wherein at least one auxiliary positioning rail is provided on the connecting member, and a matched auxiliary positioning bump corresponding to the auxiliary positioning rail is provided on the base stand, such that as the locking bump is inserted into the insert-fitting rail, the auxiliary positioning bump is also inserted into the auxiliary positioning rail.

9. A table, comprising a tabletop and a table frame, wherein the table frame refers to the table frame according to claim 1.

\* \* \* \* \*